P. KESTNER.
APPARATUS FOR RAISING LIQUIDS BY COMPRESSED AIR.
APPLICATION FILED OCT. 15, 1909.
1,025,699.
Patented May 7, 1912.
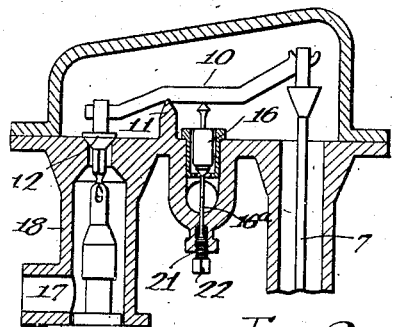
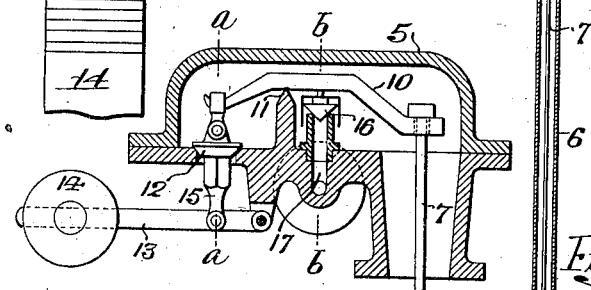
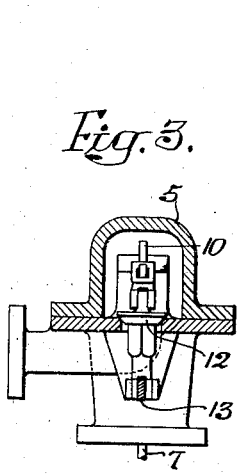
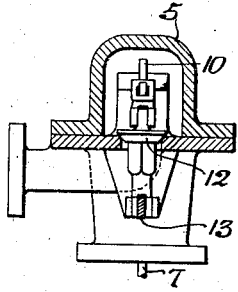
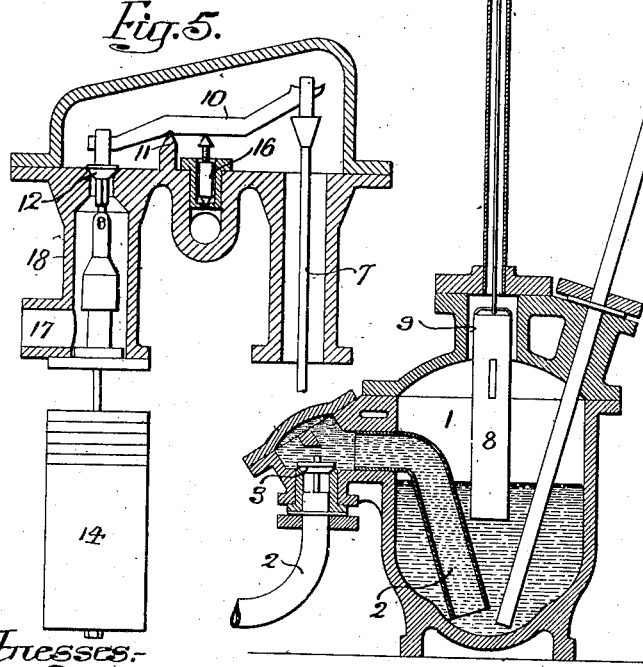
Witnesses:-
Wm. E. Shupe.
Augustus B. Coppes
Inventor:-
Paul Kestner
by his Attorneys:-
Howson & Howson

UNITED STATES PATENT OFFICE.

PAUL KESTNER, OF LILLE, FRANCE.

APPARATUS FOR RAISING LIQUIDS BY COMPRESSED AIR.

1,025,699.   Specification of Letters Patent.   Patented May 7, 1912.

Application filed October 15, 1909. Serial No. 522,810.

*To all whom it may concern:*

Be it known that I, PAUL KESTNER, a citizen of the Republic of France, and a resident of Lille, Department Nord, France, have invented certain Improvements in Apparatus for Raising Liquids by Compressed Air, of which the following is a specification.

This invention has reference to that class of apparatus working on the pulsation principle for raising liquids, in which a single chamber first fills up with the liquid to be raised that flows under a head into the apparatus through a retaining valve and is then emptied by admitting compressed air into the chamber. Such apparatus must be provided with a device which alternately opens and closes the compressed air inlet, and simultaneously with the opening and closing respectively, shuts off and establishes communication between the air inlet valve box and the atmosphere, and my invention consists of an automatically operating device of this kind, fully illustrated in the accompanying drawings, in which:

Figure 1, shows a complete apparatus of the kind in question intended more especially for raising an acid liquid; Fig. 2, is an enlarged view of my automatically operating valve structure. Figs. 3 and 4, are sectional views on the lines $a$—$a$ and $b$—$b$ respectively, Fig. 2; Fig. 5, shows a variation of the valve structure, and Fig. 6, is a view illustrating a detail of my invention.

Referring to the drawings, 1 represents the pulsation chamber, which is provided with an inlet pipe 2 by which the liquid enters under sufficient head through a suitable retaining valve 3, and with a discharge pipe 4 through which the liquid is forced out of the apparatus.

5 represents a box inclosing the valve-motion, *i. e.* the part of the apparatus which forms the subject-matter of the present invention. The chamber formed by this box communicates with the chamber 1 by means of a tube 6 through which a rod or wire 7 passes, connecting the valve structure contained in said box 5 to a cylindrical body 8, the upper part of which extends into a cylindrical recess 9 formed in the upper part of the chamber 1. From Figs. 2, 3 and 4, which show the box inclosing the valve structure on an enlarged scale, it will be seen that the rod 7 is suspended from one end of a lever 10 in the form of a balance beam which rests or is fulcrumed upon a knife edge 11. The other end of this beam carries an exhaust valve 12, and an outside lever 13 provided with a counterweight 14 is hooked onto the stem 15 of said exhaust valve. When the chamber 1 is empty or filling, the longer arm of the beam or lever 10 bears downwardly upon a valve 16 closing a passage 17 through which compressed air is admitted. It will be seen from the arrangement in which the counterweight 14 overbalances the cylinder 8 when it is completely submerged, therefore, that when the counterweight 14 may act, the valve structure is arrested by the closing of the exhaust valve 12 as the air inlet valve 16 is opened; and that on the other hand, when the cylinder 8 may act, the lever 10 closes the compressed air inlet valve 16, while the exhaust valve 12 is simultaneously opened.

The action of the apparatus is as follows: Assuming the chamber 1 to be empty to commence with, the full weight of the cylinder 8 acts upon the compressed air inlet valve 16, and the exhaust through the valve 12 being free, liquid can flow into the chamber 1. The weight and the volume of the cylindrical float 8 are such that so long as the liquid does not extend up to the cylindrical recess 9 into which the upper part of this float enters, the weight of the float overbalances the counterweight 14 and is sufficient to keep the compressed air inlet valve 16 closed. But immediately the liquid has filled the chamber 1 completely and reaches the cylindrical recess 9, the conditions change. At this moment the cylinder 8 being entirely immersed in the liquid loses its preponderance and the counterweight 14 overbalances the same, the result being that the beam 10 is tilted, closing the valve 12 and opening the valve 16 and the compressed air rushes in through the latter and forces the liquid out of the chamber 1 through the pipe 4. The pressure within the apparatus keeps the exhaust valve 12 closed, the surface of this valve being such that even when the cylinder 8 is completely out of the liquid its weight cannot drag the said valve from its seat. When the liquid has been completely forced out, the air escapes in its turn through the pipe 4 and this brings about an instantaneous lowering of the pressure within the apparatus. At this moment the valve 12 is lifted from its seat by the action of the weight of the cylinder 8, and the beam or lever 10 falls upon and closes the valve 16 and a fresh pulsation begins.

In the valve structure shown in Fig. 5, the construction is somewhat varied. In this arrangement, the counterweight 14 acts directly upon the exhaust valve 12, and the exhaust takes place through a passage 17 formed at the side of an exhaust box 18 so that the exhaust air may be carried away by suitable piping in order to obviate the danger attending the discharge of acid vapors, and the lever 10 bears upon the air inlet valve 16 through the intermediary of a screw 19 by means of which the length of stroke can be readily limited according to requirements. It is well known that with a small output, apparatus of this kind is not very certain in its action unless the stroke is reduced to the minimum. Regulation of the stroke may be effected from the outside in various simple ways; for example, by adjusting the seat of the escape valve 12, or the knife edge 11, or the compressed air valve 16, and these adjustments may be made by hand. In Fig. 6, I have shown means for adjusting the compressed air valve 16. In this instance I provide a stem 16ª adapted to contact with the valve; which stem 16ª extends below the casing of the valve structure and is provided with a threaded portion 20 and a polygonal head 21 for engagement by a wrench to effect the desired adjustment. The stem 16ª may be packed to avoid leakage.

I claim:

1. In pulsation apparatus for raising liquids, of that type in which a body immersed in the liquid in the pulsation chamber is balanced exteriorly by a counterweight, the said liquid being forced out of the chamber by compressed air, the combination of a valve structure comprising an inlet valve, an exhaust valve, a fulcrumed lever which acts upon said valves on both sides of its support, a casing in free communication with the pulsation chamber in which said valve structure is completely inclosed, means for actuating said lever, and means for adjusting the length of the stem of the inlet valve to vary the movement of said valve.

2. The combination in a pulsation apparatus, of a valve structure comprising inlet and outlet valves, a lever for operating the same, and means for actuating the lever, of a device for enabling the stroke of the valves to be regulated according to the output of the apparatus, the said regulating device being adapted to be operated from the outside.

In testimony whereof, I have signed by name to this specification, in the presence of two subscribing witnesses.

PAUL KESTNER.

Witnesses:
HENRI CHARRIER,
LÉON PECKEL.